United States Patent
Tanida et al.

(10) Patent No.: US 11,518,902 B2
(45) Date of Patent: Dec. 6, 2022

(54) ETHYLENE-VINYL ALCOHOL COPOLYMER PARTICLES, METHOD FOR PRODUCING SAME AND USE OF SAME

(71) Applicant: KURARAY CO., LTD., Kurashiki (JP)

(72) Inventors: Tatsuya Tanida, Kurashiki (JP); Keisuke Morikawa, Kurashiki (JP); Masato Nakamae, Kurashiki (JP); Seisuke Inada, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 416 days.

(21) Appl. No.: 16/756,243

(22) PCT Filed: Oct. 16, 2018

(86) PCT No.: PCT/JP2018/038403
§ 371 (c)(1),
(2) Date: Apr. 15, 2020

(87) PCT Pub. No.: WO2019/078181
PCT Pub. Date: Apr. 25, 2019

(65) Prior Publication Data
US 2020/0299435 A1 Sep. 24, 2020

(30) Foreign Application Priority Data
Oct. 17, 2017 (JP) .............................. JP2017-200943

(51) Int. Cl.
| C09D 129/04 | (2006.01) |
| C08F 216/06 | (2006.01) |
| C08J 7/043 | (2020.01) |
| C08J 7/048 | (2020.01) |

(52) U.S. Cl.
CPC .......... *C09D 129/04* (2013.01); *C08F 216/06* (2013.01); *C08J 7/043* (2020.01); *C08J 7/048* (2020.01)

(58) Field of Classification Search
CPC ..................................................... C08F 216/06
See application file for complete search history.

(56) References Cited

U.S. PATENT DOCUMENTS

| 6,472,470 B1 | 10/2002 | Fujiwara et al. |
| 2002/0028871 A1* | 3/2002 | Kawahara ................ B29B 9/12 524/524 |
| 2016/0319048 A1 | 11/2016 | Kato et al. |

FOREIGN PATENT DOCUMENTS

| JP | 11 -21 320 A | 1/1999 |
| JP | 2000-309607 A | 11/2000 |
| JP | 2011-202052 A | 10/2011 |
| JP | 2013-95868 A | 5/2013 |
| WO | WO 2015/098996 A1 | 7/2015 |
| WO | WO 2017/047806 A1 | 3/2017 |

OTHER PUBLICATIONS

International Search Report dated Nov. 20, 2018 in PCT/JP2018/038403 filed on Oct. 16, 2018, 2 pages.

* cited by examiner

*Primary Examiner* — Wenwen Cai
(74) *Attorney, Agent, or Firm* — Oblon, McClelland, Maier & Neustadt, L.L.P.

(57) ABSTRACT

The present invention relates to ethylene-vinyl alcohol copolymer particles, comprising an ethylene-vinyl alcohol copolymer having an ethylene unit content of 1 mol % or more and less than 20 mol %, a viscosity-average polymerization degree of 200 to 5000, and a saponification degree of 80 to 99.99 mol %, wherein a crystallinity in water Cw (30° C.) at 30° C. and a crystallinity in water Cw (70° C.) at 70° C. as determined by pulse NMR satisfy formula (I). There is thus provided ethylene-vinyl alcohol copolymer particles having excellent solubility in water and excellent gas barrier performance.

16 Claims, No Drawings

ETHYLENE-VINYL ALCOHOL COPOLYMER PARTICLES, METHOD FOR PRODUCING SAME AND USE OF SAME

TECHNICAL FIELD

The present invention relates to ethylene-vinyl alcohol copolymer particles with excellent solubility in water and a production method therefor. The present invention also relates to a method for preparing an aqueous solution by dissolving the ethylene-vinyl alcohol copolymer particles in water. The present invention also relates to a coating method comprising applying the aqueous solution to a substrate to form a coating film.

BACKGROUND ART

Polyvinyl alcohol (hereinafter, sometimes abbreviated as "PVA") is known to be a water-soluble synthetic polymer, which is extensively used in various applications such as a starting material for a synthetic fiber vinylon, a paper processing agent, a fiber treatment agent, an adhesive, a stabilizer for emulsion polymerization and suspension polymerization, a binder for an inorganic material and a film. When a PVA is used as a gas barrier layer, it is prized because of its advantages such as excellent gas barrier performance, transparency and less problems in terms of disposal. However, it is known that a PVA film has excellent gas barrier performance under a dry atmosphere, while at a relative humidity of about 70% or more, the PVA film absorbs much moisture, leading to poor gas barrier performance.

Hygroscopicity of a PVA can be reduced by using an ethylene-vinyl alcohol copolymer in which 20 mol % or more of ethylene is copolymerized. There is, however, a problem that such an ethylene-vinyl alcohol copolymer is insoluble in water and thus needs to an organic solvent, leading to considerable degradation of working environment. There have been suggestions that a cross-linked structure is introduced by using a crosslinking modified PVA, reacting a PVA with a coupling agent or reacting a PVA with another polymer, but in these methods, voids may be formed during crosslinking, so that gas barrier performance under a high humidity atmosphere is still insufficient.

To solve the above problems, Patent Reference No. 1 has proposed an ethylene-vinyl alcohol copolymer in which an ethylene unit content is 2 to 19 mol %, a polymerization degree is 200 to 2000, a saponification degree is 80 to 99.99 mol %, and the total content of carboxyl groups and lactone rings is 0.02 to 0.4 mol %. The ethylene-vinyl alcohol copolymer, however, contains hydrophobic ethylene units, and thus has a lower solubility in water than an unmodified PVA, so that preparation of an aqueous solution requires prolonged dissolution at an elevated temperature, inevitably resulting in cost increase in dissolution. If a saponification degree is lowered for avoiding cost increase in dissolution, gas barrier performance under a high humidity is reduced and particles agglomerate during dissolution to form a lump, which rather leads to prolongation of a dissolution time.

PRIOR ART REFERENCES

Patent References

Patent Reference No. 1: JP 2000-309607 A

SUMMARY OF THE INVENTION

Problems to be Solved by the Invention

Based on the situation described above, an objective of the present invention is to provide ethylene-vinyl alcohol copolymer particles with excellent solubility in water and a production method therefor. Another objective of the present invention is to provide a method for preparing an aqueous solution comprising dissolving the ethylene-vinyl alcohol copolymer particles in water. Another objective of the present invention is to provide a coating method for comprising applying the aqueous solution to a substrate to form a coating film.

Means for Solving the Problems

The above problems can be solved by providing ethylene-vinyl alcohol copolymer particles, comprising an ethylene-vinyl alcohol copolymer having an ethylene unit content of 1 mol % or more and less than 20 mol %, a viscosity-average polymerization degree of 200 to 5000, and a saponification degree of 80 to 99.99 mol %, wherein a crystallinity in water Cw (30° C.) at 30° C. and a crystallinity in water Cw (70° C.) at 70° C. as determined by pulse NMR satisfy formula (I):

$$4 \le \frac{100 - Cw(30° \text{ C.})}{100} \times [Cw(30° \text{ C.}) - Cw(70° \text{ C.})] \le 22 \quad (I)$$

It is preferable that the saponification degree is 85 mol % or more. It is also preferable that a content of particles passing through a sieve with a mesh size of 2.5 mm is 80% by mass or more, and a content of particles passing through a sieve with a mesh size of 0.15 mm is 20% by mass or less.

The above problems can be also solved by providing a method for producing the ethylene-vinyl alcohol copolymer particles as described above, comprising
a polymerization step of copolymerizing ethylene and a vinyl ester to give an ethylene-vinyl ester copolymer; a saponification step of saponifying the ethylene-vinyl ester copolymer to give a solid block comprising an ethylene-vinyl alcohol copolymer and a solvent; a pulverizing step of pulverizing the solid block to give wet particles; a deliquoring step of mechanically removing some of the solvent from the wet particles to give deliquored particles; and a drying step of removing the remaining solvent from the deliquored particles by heating to give dry particles, wherein
the deliquored particles contain 40 to 65% by mass of the solvent; and
in the deliquored particles, a content of particles passing through a sieve with a mesh size of 5.6 mm is 80% by mass or more, and a content of particles passing through a sieve with a mesh size of 1.0 mm is less than 2% by mass.

It is preferable that in the pulverizing step, a Rockwell hardness of a cutting blade of a pulverizer is 40 to 70, and a rotation speed of the cutting blade is 200 to 550 rpm. It is also preferable that in the deliquoring step, deliquoring is performed by a centrifugal deliquoring machine. It is also preferable that the method further comprises an additional pulverizing step after the drying step.

A preferable embodiment of the present invention is a method for preparing an aqueous solution, comprising dissolving the ethylene-vinyl alcohol copolymer particles as described above in water. A further preferable embodiment of the present invention is a coating method comprising applying the aqueous solution prepared by the method as described above to a substrate, to form a coating film. It is here preferable that the coating film is a gas barrier coating film.

Effects of the Invention

Ethylene-vinyl alcohol copolymer particles of the present invention is highly soluble in water so that when being dissolved in water, fewer lumps are formed with a higher solution rate. An aqueous solution of an ethylene-vinyl alcohol copolymer can be, therefore, efficiently prepared by dissolving the ethylene-vinyl alcohol copolymer particles in water. Furthermore, a coating film with excellent barrier properties can be formed by applying the aqueous solution to a substrate.

MODES FOR CARRYING OUT THE INVENTION

[Ethylene-Vinyl Alcohol Copolymer]

Ethylene-vinyl alcohol copolymer particles of the present invention comprises an ethylene-vinyl alcohol copolymer having an ethylene unit content of 1 mol % or more and less than 20 mol %, a viscosity-average polymerization degree of 200 to 5000, and a saponification degree of 80 to 99.99 mol %, wherein a crystallinity in water Cw (30° C.) at 30° C. and a crystallinity in water Cw (70° C.) at 70° C. as determined by pulse NMR satisfy formula (I):

$$4 \le \frac{100 - Cw(30° \text{ C.})}{100} \times [Cw(30° \text{ C.}) - Cw(70° \text{ C.})] \le 22 \quad \text{(I)}$$

(Crystallinity in Water)

Ethylene-vinyl alcohol copolymer particles of the present invention is particularly characteristic in that a crystallinity in water Cw at 30° C. (30° C.) and a crystallinity in water Cw at 70° C. (70° C.) as determined by pulse NMR (nuclear magnetic resonance absorption) satisfy formula (I). It will be described below.

First, meaning of analyzing a polymer sample by pulse NMR spectroscopy will be described. In a pulse NMR spectrometer, there is a magnetostatic field generated by an electromagnet in the spectrometer. In a magnetostatic field, a nuclear spin direction of a hydrogen nucleus is aligned to the direction of the magnetostatic field. When a pulsed field is applied to such a state, the nuclear spin of the hydrogen nucleus is aligned to a direction perpendicular to the magnetostatic field, that is, an excited state. Then, a process to the state that the direction of the excited nuclear spin macroscopically returns to the original direction of the magnetostatic field is called as $T_2$ relaxation or transverse relaxation, and a time for the process is called as a relaxation time (Tau). For relaxation of a single component, a magnetization intensity (y) at a time (t) is represented by formula (II) using a relaxation strength (A) in an excited state, a relaxation time (Tau) and constants ($y_0$, W). In the equation, W is a Weibull coefficient. When W=1, formula (II) becomes an Exp type while when W=2, it becomes a Gaussian type. For a common polymer sample, $1 \le W \le 2$.

$$y = y_0 + A \times \exp\left[-\frac{1}{W} \times \left(\frac{t}{Tau}\right)^w\right] \quad \text{(II)}$$

In $T_2$ relaxation, a hydrogen nucleus attenuates while exchanging energy with another hydrogen nucleus. Therefore, when molecular mobility of the sample is high, interaction between mutually adjacent protons is small so that energy attenuation of the whole system unlikely occurs, resulting in a longer relaxation time. In contrast, when its molecular mobility is low, a relaxation time is shorter. Therefore, for a crystalline polymer material, a relaxation time is shorter in a crystal region while a relaxation time is longer in an amorphous region. An actual crystalline polymer has a crystal region and an amorphous region, and in its relaxation curve, the sum of a relaxation component derived from the crystal region with a shorter relaxation time and a relaxation component derived from the amorphous region with a longer relaxation time is observed. A magnetization intensity (y) of the whole sample at time (t) is represented by formula (III) using a constant ($y_0$), where a relaxation strength derived from the crystal region is $A_1$, a relaxation strength derived from the amorphous region is $A_2$, a relaxation time derived from the crystal region is $Tau_1$, and a relaxation time derived from the amorphous region is $Tau_2$. Since a crystalline component often shows Gaussian relaxation, W is fixed at W=2 in the first term representing a crystalline component in formula (III). $A_1/(A_1+A_2)$ derived from this formula is a crystallinity as determined by pulse NMR. Herein, pulse NMR measurement was conducted using pulse sequence called as a Solid-echo method.

$$y = y_0 + A_1 \times \exp\left[-0.5 \times \left(\frac{t}{Tau_1}\right)^2\right] + A_2 \times \exp\left[-\frac{1}{W} \times \left(\frac{t}{Tau_2}\right)^w\right] \quad \text{(III)}$$

As described above, a ratio of a crystalline component to an amorphous component in a polymer sample can be determined from a relaxation curve obtained by pulse NMR. An ethylene-vinyl alcohol copolymer is a hydrophilic polymer having a number of hydroxy groups, and thus is swollen in water, leading to reduction in crystallinity, a degree of which significantly depends on a water temperature. At a higher water temperature, a swelling degree increases, so that crystallinity is reduced. We have herein focused on a crystallinity in water Cw at 30° C. (30° C.)(%) and a crystallinity in water Cw at 70° C. (70° C.)(%) as determined by pulse NMR. Ethylene-vinyl alcohol copolymer particles of the present invention satisfy formula (I).

$$4 \le \frac{100 - Cw(30° \text{ C.})}{100} \times [Cw(30° \text{ C.}) - Cw(70° \text{ C.})] \le 22 \quad \text{(I)}$$

In formula (I), [(100−Cw(30° C.))/100] represents a ratio of an amorphous region at 30° C., and takes a value of 0 to 1. Furthermore, [Cw(30° C.)−Cw(70° C.)] is a difference between crystallinities in water between at 30° C. and 70° C., that is, an indicator of increase in an amorphous region associated with water-temperature increase, and takes a value of 0 to 100. Therefore, formula (I) as multiplication of these is an indicator of solubility of the ethylene-vinyl alcohol copolymer particles, and the value of formula (I) is more influenced by a larger absolute value of [Cw(30° C.)−Cw(70° C.)]. Generally, ethylene-vinyl alcohol copolymer particles with an ethylene unit content of 1 mol % or more and less than 20 mol % is soluble in water because of a smaller content of ethylene units. Such water-soluble ethylene-vinyl alcohol copolymer particles generally have a large value of [(100−Cw(30° C.))/100] and a small value of

[Cw(30° C.)−Cw(70° C.)], resulting in a small value of formula (I), or alternatively, have a small value of [(100−Cw(30° C.))/100] and a large value of [Cw(30° C.)−Cw(70° C.)], resulting in a large value of formula (I). Specifically, when a value of formula (I) is less than 4, the particles are soluble at a low temperature while easily forming a lump, and once formed, the lump is less soluble in water, leading to a longer time for complete dissolution. The lower limit of formula (I) is preferably 5 or more, more preferably 6 or more. On the other hand, when a value of formula (I) is more than 22, solubility in water is reduced, leading to a longer time for complete dissolution. The upper limit of formula (I) is preferably 21 or less, more preferably 20 or less. When formula (I) satisfies a particular range, ethylene-vinyl alcohol copolymer particles which is rapidly dissolved and do not easily form a lump during dissolution can be obtained. Furthermore, a film made of a coating agent prepared by dissolving ethylene-vinyl alcohol copolymer particles of the present invention in which formula (I) satisfies a particular range in water has excellent gas barrier performance.

For measurement, a sample of ethylene-vinyl alcohol copolymer particles is still placed in $H_2O$-$d_2$ at each temperature (30° C., 70° C.) for 40 min, followed by pulse NMR spectroscopy at the same temperature as that during still placing. The range from 0 to 0.8 ms in a relaxation curve obtained is fitted to formula (III) using the least square error method.

Ethylene-vinyl alcohol copolymer particles satisfying formula (I) can be produced by a special method for producing ethylene-vinyl alcohol copolymer particles comprising a polymerization step, a saponification step, a pulverizing step, a deliquoring step and a drying step. The production method will be detailed later. By employing such a special production method, the present invention has for the first time provided ethylene-vinyl alcohol copolymer particles which satisfy formula (I) and which is highly soluble in water. Ethylene-vinyl alcohol copolymer particles of the present invention will be further detailed below.

(Vinyl Ester)

Ethylene-vinyl alcohol copolymer particles of the present invention are produced by a method comprising a step of saponifying an ethylene-vinyl ester copolymer prepared by copolymerizing ethylene with a vinyl ester. Examples of a vinyl ester which can be used include vinyl formate, vinyl acetate, vinyl propionate, vinyl valerate, vinyl caprate, vinyl laurate, vinyl stearate, vinyl benzoate, vinyl pivalate and vinyl versatate, particularly preferably vinyl acetate.

(Ethylene Unit Content)

A content of ethylene units in ethylene-vinyl alcohol copolymer particles of the present invention is 1 mol % or more and less than 20 mol %. If a content of ethylene units is less than 1 mol %, gas barrier performance of a film made of a coating agent obtained under a high humidity is insufficient. A content of ethylene units is preferably 1.5 mol % or more, more preferably 2 mol % or more. If a content of ethylene units is 20 mol % or more, ethylene-vinyl alcohol copolymer particles are insoluble in water, and preparation of a coating agent becomes difficult. A content of ethylene units is preferably 15 mol % or less, more preferably 10 mol % or less, further preferably 8.5 mol % or less.

A content of ethylene units is determined, for example, by $^1$H-NMR of an ethylene-vinyl ester copolymer as a precursor or re-acetylation product of an ethylene-vinyl alcohol copolymer. A sample of the ethylene-vinyl ester copolymer is reprecipitation-purified three or more times using a mixed solution of n-hexane and acetone, and dried at 80° C. for three days under reduced pressure to prepare an ethylene-vinyl ester copolymer for analysis. The ethylene-vinyl ester copolymer for analysis is dissolved in DMSO-$d_6$ followed by $^1$H-NMR (500 MHz) analysis at 80° C. A content of ethylene units can be calculated using peaks derived from a main-chain methine of the vinyl ester (4.7 to 5.2 ppm) and peaks derived from a main-chain methylene of ethylene and the vinyl ester (0.8 to 1.6 ppm).

(Saponification Degree)

A saponification degree of ethylene-vinyl alcohol copolymer particles of the present invention is 80 to 99.99 mol %. If a saponification degree is less than 80 mol %, an aqueous solution of the ethylene-vinyl alcohol copolymer is less transparent and thus gas barrier performance of a film made of the coating agent obtained is insufficient. A saponification degree is preferably 82 mol % or more, more preferably 85 mol % or more. On the other hand, if a saponification degree is more than 99.99 mol %, an ethylene-vinyl alcohol copolymer cannot be stably produced. A saponification degree is preferably 99.5 mol % or less, more preferably 99 mol % or less, further preferably 98.5 mol % or less. A saponification degree of ethylene-vinyl alcohol copolymer particles can be determined in accordance with JIS K6726 (1994).

(Viscosity-Average Polymerization Degree)

A viscosity-average polymerization degree of ethylene-vinyl alcohol copolymer particles of the present invention is 200 to 5000. If a viscosity-average polymerization degree less than 200, gas barrier performance of a film made of a coating agent obtained is insufficient. A viscosity-average polymerization degree is preferably 250 or more, more preferably 300 or more, further preferably 400 or more. If a viscosity-average polymerization degree is more than 5000, an aqueous solution of an ethylene-vinyl alcohol copolymer becomes too viscous to be handled. A viscosity-average polymerization degree is preferably 4500 or less, more preferably 4000 or less, further preferably 3500 or less. A viscosity-average polymerization degree P can be determined in accordance with JIS K6726 (1994). Specifically, ethylene-vinyl alcohol copolymer particles of the present invention is re-saponified to a saponification degree of 99.5 mol % or more and purified, and then P can be calculated by the following equation using a limiting viscosity [η] (L/g) as determined in water at 30° C.

$$P=([\eta]\times 10000/8.29)^{(1/0.62)}$$

(Other Monomer Units)

Ethylene-vinyl alcohol copolymer particles of the present invention can contain monomer units other than vinyl alcohol units, ethylene units and vinyl ester units as long as the effects of the present invention are not impaired. Examples of such monomers include α-olefins such as propylene, n-butene and isobutylene; acrylic acid and salts thereof; acrylic acid esters; methacrylic acid and salts thereof; methacrylic acid esters; acrylamides; acrylamide derivatives such as N-methylacrylamide, N-ethylacrylamide, N,N-dimethylacrylamide, diacetone acrylamide, acrylamide propanesulfonic acid and salts thereof, acrylamide propyldimethylamine and salts or quaternary salts thereof, N-methylol acrylamide and derivatives thereof; methacrylamide; methacrylamide derivatives such as N-methylmethacrylamide, N-ethylmethacrylamide, methacrylamide propanesulfonic acid and salts thereof, methacrylamide propyldimethylamine and salts or quaternary salts thereof, N-methylol methacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids and salts or esters thereof such as maleic acid, itaconic acid and fumaric acid; vinylsilyl compounds such as vinyltrimethoxysilane; and isopropenyl acetate. A content of these monomers is, depending on an objective or use thereof, preferably 10 mol % or less, more preferably less than 5 mol %, further preferably less than 1 mol %, particularly preferably less than 0.5 mol %.

[Method for Producing Ethylene-Vinyl Alcohol Copolymer Particles]

A preferable method for producing ethylene-vinyl alcohol copolymer particles of the present invention is a production method comprising a polymerization step of copolymerizing ethylene and a vinyl ester to give an ethylene-vinyl ester copolymer; a saponification step of saponifying the ethylene-vinyl ester copolymer to give a solid block comprising an ethylene-vinyl alcohol copolymer and a solvent; a pulverizing step of pulverizing the solid block to give wet particles; a deliquoring step of mechanically removing some of the solvent from the wet particles to give deliquored particles; and a drying step of removing the remaining solvent from the deliquored particles by heating to give dry particles, wherein the deliquored particles contain 40 to 65% by mass of the solvent; and in the deliquored particles, a content of particles passing through a sieve with a mesh size of 5.6 mm is 80% by mass or more, and a content of particles passing through a sieve with a mesh size of 1.0 mm is less than 2% by mass.

It is important that like the above production method, deliquored particles obtained by pulverizing the solid block after the saponification step and then deliquoring them contain a particular rate of the solvent and have a particular particle size distribution. Thus, in the course of preparing an aqueous solution of an ethylene-vinyl alcohol copolymer, a lump is not formed, resulting in a higher solution rate. There will be detailed each step of the production method.

(Polymerization Step)

A vinyl ester can be copolymerized with ethylene by a well-known method such as bulk polymerization, solution polymerization, suspension polymerization and emulsion polymerization. Among these, bulk polymerization or solution polymerization in which polymerization proceeds in a neat system or in an organic solvent such as an alcohol can be generally employed, and preferably a solution polymerization is employed. Examples of the alcohol include lower alcohols such as methanol and ethanol, particularly preferably methanol. Polymerization can be carried out by any style of batch polymerization, semi-batch polymerization and continuous polymerization. A polymerization reactor can be a batch reactor, a tube reactor, a continuous stirred tank reactor or the like. An initiator used for the copolymerization can be selected from known initiators such as azo initiators and peroxide initiators including 2,2'-azobis(isobutyronitrile), 2,2'-azobis(4-methoxy-2,4-dimethylvaleronitrile), 2,2'-azobis(2,4-dimethyl-valeronitrile), benzoyl peroxide and n-propyl peroxydicarbonate.

There are no particular restrictions to a polymerization temperature, and it is preferably about 0 to 180° C., more preferably room temperature to 160° C., further preferably 30 to 150° C. When polymerization is conducted at a temperature of a boiling point of a solvent used in polymerization or lower, either of boiling polymerization under reduced pressure and non-boiling polymerization under normal pressure can be selected. When polymerization is conducted at a temperature of a boiling point of a solvent used in polymerization or higher, either of non-boiling under pressure and boiling polymerization under pressure can be selected.

An ethylene pressure in a polymerization reactor during polymerization is preferably 0.01 to 0.9 MPa, more preferably 0.05 to 0.7 MPa, further preferably 0.1 to 0.65 MPa. A polymerization ratio at an outlet of a polymerization reactor is, but not limited to, preferably 10 to 90%, more preferably 15 to 85%.

In the polymerization, a chain transfer agent can coexist for adjusting a viscosity-average polymerization degree of the resulting ethylene-vinyl ester copolymer. Preferable examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol; thiocarboxylic acids such as thioacetic acid; and halogenated hydrocarbons such as trichloroethylene and perchloroethylene. Inter alia, aldehydes and ketones can be suitably used. The amount of the chain transfer agent depends on a chain transfer constant of the chain transfer agent added and a viscosity-average polymerization degree of a targeted ethylene-vinyl ester copolymer, and generally it is 0.1 to 10 parts by mass based on 100 parts by mass of a vinyl ester used.

(Saponification Step)

The ethylene-vinyl ester copolymer obtained in the polymerization step is saponified by alcoholysis or hydrolysis in the presence of a catalyst in an organic solvent. Examples of a catalyst used in the saponification step include basic catalysts such as sodium hydroxide, potassium hydroxide and sodium methoxide; and acidic catalysts such as sulfuric acid, hydrochloric acid and p-toluenesulfonic acid. Examples of an organic solvent used in the saponification step include, but not limited to, alcohols such as methanol and ethanol; esters such as methyl acetate and ethyl acetate; ketones such as acetone and methyl ethyl ketone; and aromatic hydrocarbons such as benzene and toluene. These can be used alone or in combination of two or more. Among these, it is convenient and preferable that saponification reaction is conducted in the presence of sodium hydroxide as a basic catalyst using methanol or a mixed solution of methanol and methyl acetate as a solvent. The amount of the saponification catalyst is preferably 0.001 to 0.5 as a molar ratio to vinyl ester monomer units in the ethylene-vinyl ester copolymer. The molar ratio is more preferably 0.002 or more. The molar ratio is more preferably 0.4 or less, further preferably 0.3 or less.

A suitable embodiment of the saponification step is as follows. First, a saponification catalyst such as sodium hydroxide is added to a solution of the ethylene-vinyl ester copolymer obtained in the polymerization step, followed by admixing. Here, a solvent is preferably methanol. At the initiation of admixing, the mixture is a homogeneous liquid, and as the saponification reaction proceeds and the vinyl ester units in the polymer are saponified and converted to vinyl alcohol units, solubility in the solvent is reduced so that the polymer precipitates from the solution. Here, the solution contains methyl acetate formed by alcoholysis by methanol. As the saponification proceeds, the amount of polymer precipitate gradually increases to give a slurry which then loses fluidity. Therefore, for allowing the saponification reaction to homogeneously proceed, it is important that the system is fully admixed before loss of fluidity.

There are no particular restrictions to a method for mixing a solution of an ethylene-vinyl ester copolymer and a saponification catalyst, and various methods such as a static mixer, a kneader and a stirring blade. Preferably, a static mixer is used because it can achieve continuous and homogeneous mixing. Here, in a pipe connected to a polymerization tank, a saponification catalyst is added to the solution of the ethylene-vinyl ester copolymer after the polymerization step, and then the mixture is passed through a static mixer for mixing to give a paste. A reaction temperature in the static mixer is generally 20 to 80° C.

There are no particular restrictions to a method for allowing a saponification reaction of the ethylene-vinyl ester copolymer in the paste passing through the static mixer to proceed, and a preferable method is by placing the paste on a moving belt and moving the belt in a tank kept at a constant temperature while allowing the saponification reaction to proceed. The paste on the belt loses fluidity to be a solid state and the saponification reaction further proceeds in a solid state. This method allows for continuously proceeding the saponification reaction in a solid state, giving a solid block containing the ethylene-vinyl alcohol copolymer and the solvent. A saponification temperature is preferably 20 to 60° C. If a saponification temperature is too low, a reaction rate is reduced. A saponification temperature is preferably 25° C. or higher, further preferably 30° C. or higher. If a saponification temperature is too high, a large amount of the solvent evaporates, so that a solvent content in a solid block obtained is reduced, leading to deterioration in solubility of the ethylene-vinyl alcohol copolymer obtained. A saponification temperature is more preferably 55° C. or lower, further preferably 50° C. or lower. A saponification time is preferably 5 min or more and 2 hours or less. A saponification time is more preferably 8 min or more, further preferably 10 min or more. A saponification time is more preferably 1 hour or less, further preferably 45 min or less.

(Pulverizing Step)

The solid block obtained in the saponification step is pulverized to give wet particles containing a solvent. There are no particular restrictions to a pulverizer used herein as long as a rotation speed or the like of the pulverizer can be adjusted to achieve a particle size distribution as defined in the present invention, and any known pulverizer or crusher can be used. In terms of dynamic properties of an ethylene-vinyl alcohol copolymer obtained through the saponification step, a cutting type crusher such as a cutter mill, a Guillotine cutter, a reciprocating cutter type crusher, and a uniaxial-shear, biaxial-shear or triaxial-shear crusher is preferable. In pulverization, a Rockwell hardness (HRC) of a cutting blade contacting the solid block is preferably 40 to 70. The hardness is more preferably 45 or more. The hardness is more preferably 65 or less. A rotation speed of the cutting blade is preferably 200 to 550 rpm. The rotation speed is more preferably 225 rpm or more, further preferably 250 rpm or more. The rotation speed is more preferably 500 rpm or less, further preferably 450 rpm or less.

Conventionally, a solid block obtained in a saponification step has been generally pulverized by a pulverizer equipped with a cutting blade with a Rockwell hardness of less than 40, which is operated at a rotation speed of more than 550 rpm. Since the cutting blade used has a low Rockwell hardness, the cutting blade tends to be abraded and thus cutting using such an abraded cutting blade tends to lead to uneven pulverization. When a solid block is pulverized at a high rotation speed, the solid block is strongly vibrated up and down at the inlet of the crusher by impact of pulverization, leading to uneven breaking during pulverization. In such circumstances, it has been difficult to stably obtain particles having a particular particle size distribution as defined in the present invention. If a Rockwell hardness of the cutting blade is more than 70, the blade is of high hardness while being of lower toughness, and thus during pulverization, fine chippings are generated in the cutting blade, leading to tendency to uneven pulverization. If a rotation speed of the pulverizer is less than 200 rpm, there is tendency to reduction in pulverization efficiency.

(Washing Step)

After the pulverizing step, if necessary, wet particles can be washed by adding a washing step for removing impurities such as sodium acetate. Examples of a washing liquid include lower alcohols such as methanol and ethanol; lower fatty acids such as methyl acetate; and mixtures thereof. There are no particular restrictions to the conditions of the washing step, and the particles are preferably washed at 20° C. to a boiling point of the washing liquid for 30 min to 10 hours.

(Deliquoring Step)

After the pulverizing step and sometimes after the washing step, some of the solvent was mechanically removed from the wet particles, to give deliquored particles. A deliquoring machine is preferably a centrifugal deliquoring machine. A centrifugal deliquoring machine is preferably able to conduct continuous centrifugal deliquoring, including an automatic discharge type centrifugal deliquoring machine, a screw discharge type centrifugal deliquoring machine, a vibration discharge type centrifugal deliquoring machine and an extrusion plate type centrifugal deliquoring machine. Conventionally, a squeeze deliquoring machine has been used for deliquoring of pulverized particles. However, for achieving a solvent content of deliquored particles obtained within the above particular range, squeezing strength must be increased, and consequently, the deliquored particles are deformed or broken so that a particle size distribution deviates from the range as defined in the present invention. In other words, it is difficult to simultaneously achieve desired values of a particle size distribution and a solvent content of deliquored particles by the conventional method. In the deliquoring step of the present invention, by employing the above centrifugal deliquoring machine, deliquored particles having a particle size distribution and a solvent content as defined in the present invention can be easily achieved.

It is important that deliquored particles thus obtained contains 40 to 65% by mass of a solvent. If a solvent content is less than 40% by mass, some particles are excessively dried, and after the drying step, ethylene-vinyl alcohol copolymer particles satisfying formula (I) cannot be obtained due to contamination with poorly-soluble ethylene-vinyl alcohol copolymer particles. A solvent content is preferably 42% by mass or more, more preferably 45% by mass or more. If a solvent content is more than 65% by mass, difference in heat history between the surface and the inside of particles is generated, so that ethylene-vinyl alcohol copolymer particles satisfying formula (I) cannot be obtained and energy required for drying is increased. A solvent content is preferably 62% by mass or less, more preferably 59% by mass or less. A solvent content herein is an average of those of deliquored particles. A solvent content of deliquored particles is preferably lower by 3% by mass or more, more preferably by 5% by mass or more, further preferably 10% by mass or more, than a solvent content of wet particles.

It is important that in the deliquored particles, a content of particles passing through a sieve with a mesh size of 5.6 mm is 80% by mass or more, and a content of particles passing through a sieve with a mesh size of 1.0 mm is less than 2% by mass. In other words, it is important that not only coarse particles but also fine particles are not contained so much. Herein, a mesh size of a sieve is determined in accordance with a nominal mesh size of JIS Z 8801-1 (2006).

In the deliquored particles, a content of particles passing through a sieve with a mesh size of 5.6 mm is 80% by mass or more. If the deliquored particles contain many coarse particles, drying at a higher temperature or for a long time is required for fully drying the particles to the center, and energy required for drying is increased. Furthermore, by drying at a high temperature or for a long time, smaller particles are excessively crystallized, and thus after the drying step, contamination with poorly-soluble ethylene-vinyl alcohol copolymer particles occurs. Existence of coarse particles causes uneven heat transfer in a drier. Considering these situations, ethylene-vinyl alcohol copolymer particles satisfying formula (I) are not obtained. A content of particles passing through a sieve with a mesh size of 5.6 mm is preferably 82% by mass or more, more preferably 85% by mass or more. In the light of a production efficiency, a content of particles passing through a sieve with a mesh size of 5.6 mm is preferably 99% by mass or less, more preferably 98% by mass or less.

In the deliquored particles, a content of particles passing through a sieve with a mesh size of 1.0 mm is less than 2% by mass. If the deliquored particles contains many fine particles, subsequent drying causes excessive crystallization of the fine particles, leading to contamination with many poorly-soluble ethylene-vinyl alcohol copolymer particles after the drying step. Furthermore, the fine particles reside in the bottom of the drier and are excessively heated, leading to excessively higher crystallinity and again contamination with ethylene-vinyl alcohol copolymer particles with poor solubility. In such circumstances, ethylene-vinyl alcohol copolymer particles satisfying formula (I) cannot be obtained. A content of particles passing through a sieve with a mesh size of 1.0 mm is preferably 1.9% by mass or less, more preferably 1.8% by mass or less. In the light of a production efficiency, a content of particles passing through a sieve with a mesh size of 1.0 mm is preferably 0.05% by mass or more, more preferably 0.1% by mass or more.

(Drying Step)

The deliquored particles after the deliquoring step can be subjected to the drying step, to give ethylene-vinyl alcohol copolymer particles of the present invention. Specifically, hot-air drying using a cylindrical drier is preferable, and a particle temperature during the drying is preferably 80 to 120° C. If the temperature is too low, a production efficiently is reduced. The temperature is preferably 90° C. or higher. If the temperature is too high, excessively crystallized particles are generated, leading to deterioration in solubility. The temperature is more preferably 110° C. or lower. A drying time is preferably 2 to 10 hours, more preferably 3 to 8 hours. With drying conditions within the above ranges, ethylene-vinyl alcohol copolymer particles satisfying formula (I) can be easily produced.

(Additional Pulverizing Step)

After the drying step, it is preferable that an additional pulverizing step for further reducing a particle size is conducted, whereby particles with a higher dissolution rate in water. A pulverizer used in the additional pulverizing step can be the same pulverizer as that used in the above pulverizing step.

The ethylene-vinyl alcohol copolymer particles obtained by the additional pulverizing step preferably have a content of particles passing through a sieve with a mesh size of 2.5 mm of 80% by mass or more. If a content of particles passing through a sieve with a mesh size of 2.5 mm is less than 80% by mass, a dissolution rate is reduced when dissolving ethylene-vinyl alcohol copolymer particles in water to prepare an aqueous solution, so that heating for a long time is required. A content of particles passing through a sieve with a mesh size of 2.5 mm is more preferably 83% by mass or more, further preferably 85% by mass or more. Furthermore, in the ethylene-vinyl alcohol copolymer particles, a content of particles passing through a sieve with a mesh size of 1.0 mm is preferably 80% by mass or more. Thus, a dissolution rate in water is further improved. A content of particles passing through a sieve with a mesh size of 1.0 mm is more preferably 83% by mass or more, further preferably 85% by mass or more.

In the ethylene-vinyl alcohol copolymer particles obtained in the additional pulverizing step, a content of particles passing through a sieve with a mesh size of 0.15 mm is preferably 20% by mass or less. If a content of particles passing through a sieve with a mesh size of 0.15 mm is more than 20% by mass, a lump tends to be formed when the ethylene-vinyl alcohol copolymer particles are dissolved in water. A content of particles passing through a sieve with a mesh size of 0.15 mm is more preferably 17% by mass or less, further preferably 15% by mass or less.

(Aqueous Solution of an Ethylene-Vinyl Alcohol Copolymer)

The ethylene-vinyl alcohol copolymer particles of the present invention thus obtained is excellent in solubility in water and is less likely to form a lump during dissolution and is rapidly dissolved. The ethylene-vinyl alcohol copolymer particles of the present invention are, therefore, suitably used as an aqueous solution. A suitable content of the ethylene-vinyl alcohol copolymer in the aqueous solution is 2 to 100 parts by mass based on 100 parts by mass of water, which is adjusted, depending on its intended use.

(Coating Agent)

A suitable application of the ethylene-vinyl alcohol copolymer particles of the present invention is a coating agent. A film made of the coating agent contains a particular ethylene-vinyl alcohol copolymer, and, therefore, excellent in gas barrier performance under high humidity. An oxygen transmission rate as an index of gas barrier performance is determined by heating a film produced by depositing the above coating agent in the air at 180° C. for 120 sec, followed by adjusting humidity at 20° C. and 85% RH, then measuring an oxygen transmission rate of the film, and converting the measured value for a coating agent thickness of 20 μm. For a laminate comprising a layer made of the ethylene-vinyl alcohol copolymer of the present invention, an oxygen transmission rate is determined by measuring an oxygen transmission rate of the laminate and then converting the measured value for the ethylene-vinyl alcohol copolymer layer thickness of 20 μm. Since oxygen-gas barrier performance of an ethylene-vinyl alcohol copolymer layer is generally considerably lower than oxygen-gas barrier performance of a substrate film, oxygen-gas barrier performance of a laminate is substantially dependent on oxygen-gas barrier performance of the ethylene-vinyl alcohol copolymer layer. Therefore, even for a laminate, an oxygen transmission rate converted for an ethylene-vinyl alcohol copolymer layer thickness of 20 μm can be calculated. Hereinafter, unless otherwise indicated, an oxygen transmission rate means an oxygen transmission rate converted for an ethylene-vinyl alcohol copolymer layer thickness of 20 μm. An oxygen transmission rate as determined by the above method is preferably 15 cc/m²·day·atm or less, more preferably 10 cc/m²·day·atm or less, further preferably 5 cc/m²·day·atm or less.

A coating agent of the present invention can contain, in addition to an ethylene-vinyl alcohol copolymer, an inorganic lamellar compound, a crosslinking agent, a surfactant, a leveling agent, an antifungal agent, a preservative and the like.

Examples of an inorganic lamellar compound include micas, talc, montmorillonite, kaolinite and vermiculite. By adding an inorganic lamellar compound, gas barrier performance, film strength and handleability are improved.

Examples of a crosslinking agent include epoxy compounds, isocyanate compounds, aldehyde compounds, titanium compounds, silica compounds, aluminum compounds, zirconium compounds and boron compounds. Among these, silica compounds such as colloidal silica and alkyl silicates are preferable. By adding a crosslinking agent, water resistance can be endowed.

Examples of a substrate on which a coating agent of the present invention is applied include films such as a polyolefin film, a polyester film and a polyamide film; a paper; and an nonwoven fabric. A thickness of a substrate (a final thickness when it is oriented) is preferably 5 to 100 μm.

When a coating agent of the present invention is applied to a substrate to provide a laminate, the coating agent is generally applied as an aqueous solution. A content of the ethylene-vinyl alcohol copolymer in the solution is, but not limited to, preferably 3 to 50% by mass, more preferably 5 to 40% by mass. If the concentration is less than 3% by mass, drying after applying the coating agent tends to take a long time at a higher temperature. If the concentration is more than 50% by mass, the coating agent becomes so viscous that coating performance tends to be lowered.

A temperature of applying the coating agent is preferably 20 to 80° C. Suitable examples of a coating method include rotogravure roll coating, reverse gravure coating, reverse roll coating and mayer bar coating. Examples of a method for coating with a coating agent include a method wherein a substrate film is oriented or heated followed by coating; and a method wherein coating is performed followed by orienting or heating a resulting laminate. A thickness of a coating agent (a final thickness when it is oriented) is preferably 0.1 to 20 μm, more preferably 0.1 to 9 μm.

There are no particular restrictions to drying conditions after coating a substrate with a coating agent of the present invention, and preferably, the surface of a film consisting of a polyolefin film, a polyester film or a polyamide film is coated with a coating agent and then dried preferably at an evaporation rate of 2 to 2000 g/m²·min, more preferably 50 to 500 g/m²·min.

An adhesive component layer can be inserted between a coating layer made of a coating agent of the present invention and a substrate layer in the light of improving adhesiveness. The adhesive component can be applied to the surface of a substrate film before coating with a coating agent or used as a mixture with an aqueous solution of a coating agent.

(Other Applications)

Ethylene-vinyl alcohol copolymer particles of the present invention can be used for various applications, examples of which are, but not limited to, as follows.

(1) Application for dispersant for vinyl chlorides: a dispersion stabilizer for suspension polymerization and a dispersion aid for vinyl chloride and vinylidene chloride, (2) Application for covering agent: a sizing, a fiber treatment agent, a leather finishing agent, a paint, an antifogging agent, a metal corrosion inhibitor, a brightening agent for zinc plating, an antistatic agent, (3) Application for adhesive/binder: an adhesive, a sticking agent, a remoistening adhesive, various binders, and additive for a cement and a mortar, (4) Application for dispersion stabilizer: a dispersion stabilizer for an organic or inorganic pigment such as a paint and an adhesive; a dispersion stabilizer for emulsion polymerization for various vinyl compounds; and a post-emulsifier such as Bitumen.

(5) Application for paper processing: a paper strengthening agent, an oil-resistance/solvent-resistance imparting agent, a smoothness improver, a surface gloss improving aid, an extender, a barrier agent, a light-resistance imparting agent, a water resistant additive, a dye/developer dispersant, an adhesion improver and a binder, (6) Application for agriculture: a binder for an agrochemical binder, an agrochemical spreader, an agrochemical coating, a soil conditioner, an anti-erosion agent, and an agrochemical dispersion, (7) Application for medicines and cosmetics: a granulating binder, a coating agent, an emulsifier, a patch, a binder, a film preparation substrate, and a film-forming agent, (8) Application for viscosity modifier: a thickener and a rheology modifier, (9) Application for flocculant: a flocculant for aquatic suspended matter and dissolved matter and a metal flocculant,

(10) Application for film: a water-soluble film, a polarizing film, a barrier film, a film for wrapping a textile product, a seed-growing sheet, a vegetation sheet, a seed tape, and a hygroscopic sheet,

(11) Application for shaped article: a fiber, a film, a sheet, a pipe, a tube, a leakage prevention film, a water-soluble fiber for a chemical lace and a sponge,

(12) Application for resin raw material: a raw material for a polyvinyl butyral, a raw material for a photosensitive resin, a raw material for a graft polymer, and a raw material for various gels. and

(13) Application for post-reaction: post-reaction with a low-molecular organic compound, a macromolecular organic compound or an inorganic compound.

The present invention encompasses various combination aspects within the technical scope of the present invention as long as the present invention is beneficially effective.

EXAMPLES

There will be further specifically described the present invention with reference to examples, but the present invention is not limited to these examples in any way.

[Content of Ethylene Units in Ethylene-Vinyl Alcohol Copolymer Particles]

It was determined from $^1$H-NMR of an ethylene-vinyl ester copolymer as a precursor or re-acetylation product of an ethylene-vinyl alcohol copolymer. Specifically, an ethylene-vinyl ester copolymer obtained was reprecipitation-purified three times or more using a mixed solution of n-hexane and acetone, and then dried under reduced pressure at 80° C. for 3 days, to prepare an ethylene-vinyl ester copolymer for analysis. The ethylene-vinyl ester copolymer for analysis was dissolved in DMSO-$d_6$ and analyzed by $^1$H-NMR (500 MHz) at 80° C. A content of ethylene units was calculated using peaks derived from a main-chain methine of the vinyl ester (4.7 to 5.2 ppm) and peaks derived from a main-chain methylene of ethylene and the vinyl ester (0.8 to 1.6 ppm).

[Viscosity-Average Polymerization Degree of Ethylene-Vinyl Alcohol Copolymer Particles]

A viscosity-average polymerization degree of ethylene-vinyl alcohol copolymer particles was determined in accordance with the method as described in JIS K6726 (1994).

[Saponification Degree of Ethylene-Vinyl Alcohol Copolymer Particles]

A saponification degree of ethylene-vinyl alcohol copolymer particles was determined in accordance with the method as described in JIS K6726 (1994).

[Crystallinity in Water of Ethylene-Vinyl Alcohol Copolymer Particles]

A sample of ethylene-vinyl alcohol copolymer particles was still placed in $H_2O$-$d_2$ at each temperature (30° C., 70° C.) for 40 min, followed by pulse NMR spectroscopy at the same temperature as that during still placing. The range from 0 to 0.8 ms in a relaxation curve obtained was fitted to formula (III) using the least square error method.

$$y = y_0 + A_1 \times \exp\left[-0.5 \times \left(\frac{t}{Tau_1}\right)^2\right] + A_2 \times \exp\left[-\frac{1}{W} \times \left(\frac{t}{Tau_2}\right)^w\right] \quad (III)$$

[Lump Forming Property]

In a 300 mL separable flask was placed 150 mL of distilled water, which was then heated to an internal temperature of 70° C. After the heating, 6 g of ethylene-vinyl alcohol copolymer particles were added with stirring at 150 rpm. The state of the ethylene-vinyl alcohol copolymer particles immediately after the addition was visually observed and evaluated as described below.

A: No lumps were formed.

B: Lumps were formed but disappeared after stirring for 5 min.

C: Lumps were formed and did not disappear after stirring for 5 min.

[Solubility]

In a 500 mL separable flask was placed 288 g of distilled water, which was then heated to an internal temperature of 85° C. After the heating, 12 g of ethylene-vinyl alcohol copolymer particles were added with stirring at 150 rpm. Thirty minutes after the addition, the aqueous solution of the ethylene-vinyl alcohol copolymer was collected. The collected aqueous solution was filtrated through a No. 5A filter, and the filtrate was dried at 125° C. for 3 hours, and the mass A (g) of the ethylene-vinyl alcohol copolymer dissolved in the aqueous solution was determined. Furthermore, 12 g of the ethylene-vinyl alcohol copolymer particle sample was dried at 125° C. for 3 hours, and the mass B (g) of non-volatile components was determined. Then, a solubility (% by mass)=A/B×100 was calculated. The calculated solubility was evaluated in accordance with the following criteria.

A: 60% by mass or more

B: 50% by mass or more and less than 60% by mass

C: less than 50% by mass

Example 1

(Polymerization Step)

A continuous polymerization tank equipped with a reflux condenser, a material supply line, a reaction liquid removing line, a thermometer, a nitrogen inlet, an ethylene inlet and a stirring blade was used. To the continuous polymerization tank were continuously supplied 671 L/hr of vinyl acetate, 147 L/hr of methanol, and 2.6 L/hr of a 1% solution of 2,2'-azobis(4-methoxy-2,4-dimethylvaleronitrile) in methanol, using a constant rate pump. An ethylene pressure in the tank was adjusted to be 0.23 MPa. A polymerization solution was continuously removed from the continuous polymerization tank such that the liquid level in the polymerization tank was kept constant. The reaction was adjusted such that a polymerization ratio at the outlet of the continuous polymerization tank was 30%. A residence time in the continuous polymerization tank was 5 hours. A temperature at the outlet of the continuous polymerization tank was 60° C. A polymerization liquid was collected from the continuous polymerization tank and methanol vapor was introduced to the collected liquid to remove unreacted vinyl acetate monomer, to give a solution of an ethylene-vinyl ester copolymer (PVAc) in methanol (concentration: 32% by mass).

(Saponification Step)

To a solution of the ethylene-vinyl ester copolymer obtained in the polymerization step in methanol (concentration: 32% by mass) was added a solution of sodium hydroxide in methanol (concentration: 4% by mass) as a saponification catalyst, such that a molar ratio of sodium hydroxide to vinyl acetate units in the ethylene-vinyl ester copolymer was 0.012. The solution of the ethylene-vinyl ester copolymer and the solution of the saponification catalyst were mixed by a static mixer, to give a mixture. The mixture paste thus obtained was placed on a belt and kept at 40° C. for 18 min to allow a saponification reaction to proceed. Thus, a solid block containing the ethylene-vinyl alcohol copolymer and the solvent was obtained. The polymerization conditions and the saponification conditions are summarized in Table 1.

(Pulverizing Step)

The solid block obtained in the saponification step was pulverized by a uniaxial-shear crusher to give wet particles. The crusher was equipped with a cutting blade with a Rockwell hardness of 45, and a rotation speed of the cutting blade was 250 rpm. A solvent content of the wet particles was 69% by mass.

(Deliquoring Step)

The wet particles obtained in the pulverizing step was deliquored by a screw discharge type centrifugal deliquoring machine, to give deliquored particles, in which a proportion of particles passing through a sieve with a mesh size of 5.6 mm was 93% by mass, a proportion of particles passing through a sieve with a mesh size of 1.0 mm was 1.2% by mass, and a solvent content was 55% by mass. The pulverization conditions and the deliquoring conditions are summarized in Table 2.

(Drying Step)

To a drier in which an internal temperature was controlled such that a particle temperature was 100° C. was continuously fed 600 kg/hr (solid) of deliquored particles obtained in the deliquoring step. An average residence time of the particles in the drier was 4 hours.

(Additional Pulverizing Step)

The dry particles obtained in the drying step were further pulverized by a hammer mill, and passed through a filter with a mesh size of 1.4 mm, to give ethylene-vinyl alcohol copolymer particles (Particles 1). A content of ethylene units of the ethylene-vinyl alcohol copolymer in Particles 1 was 2 mol %; a viscosity-average polymerization degree was 1700; and a saponification degree was 98.5 mol %. For Particles 1, a Cw (30° C.) was 35.5%, a Cw (70° C.) was 4.9%, and a value of formula (I) was 19.7. Furthermore, in the whole Particles 1, a proportion of particles passing through a filter with a mesh size of 2.5 mm was 99% by mass; a proportion of particles passing through a filter with a mesh size of 1.0 mm was 94% by mass; and a proportion of particles passing through a filter with a mesh size of 0.15 mm was 3% by mass. Table 3 summarizes the results of evaluation of lump forming property and solubility of Particles 1 in accordance with the above-described method.

Examples 2 to 9 and Comparative Examples 1 to 4

Ethylene-vinyl alcohol copolymer particles (Particles 2 to 13) were produced as described in Example 1, except that polymerization conditions, saponification conditions, pulverization conditions and deliquoring conditions were varied as shown in Tables 1 and 2. Lump forming property and solubility of the ethylene-vinyl alcohol copolymer particles obtained were evaluated as described in Example 1. The evaluation results are summarized in Table 3.

TABLE 1

| | Polymerization conditions | | | | | Saponification conditions | |
|---|---|---|---|---|---|---|---|
| | Ethylene (MPa) | Vinyl acetate (L/hr) | Methanol (L/hr) | Initiator (L/hr) | Polymerization ratio (%) | PVAc concentration (% by mass) | NaOH (molar ratio) |
| Example 1 | 0.23 | 671 | 147 | 2.6 | 30 | 32 | 0.012 |
| Example 2 | 0.23 | 671 | 147 | 2.6 | 30 | 32 | 0.010 |
| Example 3 | 0.1 | 618 | 2 | 168.2 | 78 | 45 | 0.008 |
| Example 4 | 0.1 | 618 | 2 | 168.2 | 78 | 45 | 0.002 |
| Example 5 | 0.26 | 741 | 64 | 1.7 | 26 | 25 | 0.020 |
| Example 6 | 0.47 | 726 | 113 | 2.2 | 28 | 30 | 0.012 |
| Example 7 | 0.61 | 631 | 160 | 7.6 | 43 | 40 | 0.020 |
| Example 8 | 0.69 | 626 | 170 | 75.8 | 70 | 45 | 0.015 |
| Example 9 | 0.26 | 741 | 64 | 1.7 | 26 | 25 | 0.020 |
| Comparative Example 1 | 0.23 | 671 | 147 | 2.6 | 30 | 32 | 0.010 |
| Comparative Example 2 | 0.23 | 671 | 147 | 2.6 | 30 | 32 | 0.010 |
| Comparative Example 3 | 0.26 | 741 | 64 | 1.7 | 26 | 25 | 0.020 |
| Comparative Example 4 | 0.23 | 671 | 147 | 2.6 | 30 | 32 | 0.010 |

TABLE 2

| | Pulverization conditions | | Deliquoring conditions Type of a deliquoring machine | Deliquored particles | | |
|---|---|---|---|---|---|---|
| | Rotation speed (rpm) | Rockwell hardness | | Passing through a mesh size 5.6 mm (% by mass) | Passing through a mesh size 1.0 mm (% by mass) | Liquid content (% by mass) |
| Example 1 | 250 | 45 | Screw discharge type centrifugal deliquoring machine | 93 | 1.2 | 55 |
| Example 2 | 250 | 45 | Screw discharge type centrifugal deliquoring machine | 94 | 1.6 | 58 |
| Example 3 | 200 | 40 | Extrusion plate type centrifugal deliquoring machine | 85 | 1.1 | 60 |
| Example 4 | 200 | 40 | Extrusion plate type centrifugal deliquoring machine | 81 | 0.7 | 63 |
| Example 5 | 400 | 50 | Screw discharge type centrifugal deliquoring machine | 85 | 0.1 | 50 |
| Example 6 | 450 | 55 | Screw discharge type centrifugal deliquoring machine | 89 | 0.6 | 47 |
| Example 7 | 500 | 55 | Screw discharge type centrifugal deliquoring machine | 87 | 0.5 | 44 |
| Example 8 | 450 | 60 | Screw discharge type centrifugal deliquoring machine | 98 | 1.8 | 50 |
| Example 9 | 550 | 60 | Screw discharge type centrifugal deliquoring machine | 99 | 1.9 | 45 |
| Comparative Example 1 | 600 | 35 | Screw discharge type centrifugal deliquoring machine | 77 | 0.1 | 60 |
| Comparative Example 2 | 250 | 45 | Squeeze deliquoring machine | 88 | 0.9 | 67 |
| Comparative Example 3 | 450 | 60 | Squeeze deliquoring machine | 100 | 20 | 40 |
| Comparative Example 4 | 600 | 35 | Squeeze deliquoring machine | 76 | 2.3 | 62 |

TABLE 3

| | | Ethylene-vinyl alcohol copolymer particles | | | | | | | | | Evaluation | |
|---|---|---|---|---|---|---|---|---|---|---|---|---|
| | Copolymer particles | Ethylene unit content (mol %) | Polymerization degree | Saponification degree (mol %) | Passing through a mesh size 2.5 mm (% by mass) | Passing through a mesh size 1.0 mm (% by mass) | Passing through a mesh size 0.15 mm (% by mass) | Cw (30° C.) (%) | Cw (70° C.) (%) | Value of formula (I) | Lump forming property | Solubility |
| Example 1 | Particles 1 | 2 | 1700 | 98.5 | 99 | 94 | 3 | 35.5 | 4.9 | 19.7 | A | A |
| Example 2 | Particles 2 | 2 | 1700 | 93.0 | 99 | 94 | 5 | 9.7 | 2.1 | 6.9 | A | A |
| Example 3 | Particles 3 | 2 | 500 | 88.0 | 99 | 87 | 15 | 6.8 | 1.4 | 5.0 | B | A |
| Example 4 | Particles 4 | 2 | 500 | 80.0 | 99 | 90 | 17 | 5.6 | 1.2 | 4.2 | B | B |
| Example 5 | Particles 5 | 2 | 2300 | 99.3 | 80 | 4 | 0.1 | 49.6 | 15 | 17.4 | A | B |
| Example 6 | Particles 6 | 4 | 1700 | 98.5 | 99 | 95 | 4 | 48.2 | 11.7 | 18.9 | A | A |

TABLE 3-continued

| | | Ethylene-vinyl alcohol copolymer particles | | | | | | | | | | |
|---|---|---|---|---|---|---|---|---|---|---|---|---|
| | | Ethylene unit content (mol %) | Polymerization degree | Saponification degree (mol %) | Passing through a mesh size 2.5 mm (% by mass) | Passing through a mesh size 1.0 mm (% by mass) | Passing through a mesh size 0.15 mm (% by mass) | Cw (30° C.) (%) | Cw (70° C.) (%) | Value of formula (I) | Evaluation | |
| | Copolymer particles | | | | | | | | | | Lump forming property | Solubility |
| Example 7 | Particles 7 | 6 | 1000 | 99.2 | 99 | 93 | 7 | 51.4 | 16.8 | 16.8 | A | B |
| Example 8 | Particles 8 | 10 | 400 | 98.0 | 99 | 93 | 12 | 69.1 | 26.7 | 13.1 | A | A |
| Example 9 | Particles 9 | 4 | 1700 | 98.5 | 99 | 97 | 15 | 53.1 | 8.3 | 21.0 | A | B |
| Comparative Example 1 | Particles 10 | 2 | 1700 | 93.0 | 99 | 96 | 7 | 4.9 | 1.3 | 3.4 | C | C |
| Comparative Example 2 | Particles 11 | 2 | 1700 | 93.0 | 99 | 94 | 6 | 4.4 | 1.6 | 2.7 | C | C |
| Comparative Example 3 | Particles 12 | 2 | 2300 | 99.3 | 99 | 95 | 11 | 56 | 5.4 | 22.3 | A | C |
| Comparative Example 4 | Particles 13 | 2 | 1700 | 93.0 | 99 | 94 | 7 | 4.6 | 1.6 | 2.9 | C | C |

Example 10

(Preparation of a Coating Agent)

A 7% by mass aqueous solution of Copolymer 2 (Particles 2) was prepared and used as a coating agent. Using a gravure coater, the above coating solution was applied to the surface of an oriented polyethylene terephthalate (OPET) substrate film with a thickness of 15 μm coated with an anchor coating agent at 50° C., dried at 120° C., and furthermore, heated at 180° C. for 120 sec for promoting the reaction of the anchor coating agent. An oxygen transmission rate at 20° C. and 85% RH of the film obtained was measured and was 10.3 cc/m²·day·atm. The measurement results are shown in Table 4.

Examples 11 to 14

(Preparation of a Coating Agent)

A multilayer film coated with a coating agent was produced as described in Example 10, except that ethylene-vinyl alcohol copolymer particles, a substrate film and a heating temperature were varied as shown in Table 4. For the multilayer film obtained, an oxygen transmission rate was evaluated as an index of gas barrier performance. The measurement results are shown in Table 4.

TABLE 4

| | | Substrate film | | | |
|---|---|---|---|---|---|
| | Copolymer particles | Type [1] | Anchor coating agent | Heating temperature (° C.) | Oxygen transmission rate (cc/m²·day·atm) |
| Example 10 | Particles 2 | OPET | Yes | 180 | 10.3 |
| Example 11 | Particles 6 | OPET | Yes | 160 | 7.6 |
| Example 12 | Particles 2 | OPP | Yes | 160 | 10.7 |
| Example 13 | Particles 7 | OPP | Yes | 160 | 4.8 |
| Example 14 | Particles 7 | OPE | Yes | 160 | 5.1 |

[1] OPET: Oriented polyethylene telephthalate film
OPP: Oriented polypropylene film
OPE: Oriented polyethylene film

The invention claimed is:

1. Ethylene-vinyl alcohol copolymer particles, comprising:
    an ethylene-vinyl alcohol copolymer having an ethylene unit content of 1 mol % or more and less than 20 mol %, a viscosity-average polymerization degree of 200 to 5000, and a saponification degree of 80 to 99.99 mol %, wherein a crystallinity in water Cw (30° C.) at 30° C. and a crystallinity in water Cw (70° C.) at 70° C. as determined by pulse NMR satisfy formula (I):

$$4 \leq \frac{100 - Cw(30°\ C.)}{100} \times [Cw(30°\ C.) - Cw(70°\ C.)] \leq 22. \quad (I)$$

2. The ethylene-vinyl alcohol copolymer particles according to claim 1, wherein the saponification degree is 85 mol % or more.

3. The ethylene-vinyl alcohol copolymer particles according to claim 1, wherein a content of particles passing through a sieve with a mesh size of 2.5 mm is 80% by mass or more, and
    a content of particles passing through a sieve with a mesh size of 0.15 mm is 20% by mass or less.

4. A method for producing the ethylene-vinyl alcohol copolymer particles according to claim 1, the method comprising:
    copolymerizing ethylene and a vinyl ester to give an ethylene-vinyl ester copolymer;
    saponifying the ethylene-vinyl ester copolymer to give a solid block comprising an ethylene-vinyl alcohol copolymer and a solvent;
    pulverizing the solid block to give wet particles;
    deliquoring the wet particles by mechanically removing some of the solvent from the wet particles to give deliquored particles; and
    drying the deliquored particles to remove remaining solvent from the deliquored particles by heating to give dry particles,
    wherein
    the deliquored particles contain from 40 to 65% by mass of the solvent; and in the deliquored particles, a content of particles passing through a sieve with a mesh size of 5.6 mm is 80% by mass or more, and a content of particles passing through a sieve with a mesh size of 1.0 mm is less than 2% by mass.

5. The production method according to claim 4, wherein the pulverizing comprises pulverizing the solid block with the pulverizer, a Rockwell hardness of a cutting blade of the pulverizer is 40 to 70, and a rotation speed of the cutting blade is 200 to 550 rpm.

6. The production method according to claim 4, wherein the deliquoring comprising deliquoring the wet particles with a centrifugal deliquoring machine.

7. The production method according to claim 4, further comprising an additional pulverizing step after the drying.

8. A method for preparing an aqueous solution, comprising:

dissolving the ethylene-vinyl alcohol copolymer particles according to claim 1 in water.

9. A coating method, comprising:

applying an aqueous solution prepared by the method according to claim 8 to a substrate, to form a coating film.

10. The coating method according to claim 9, wherein the coating film is a gas barrier coating film.

11. A coating agent comprising the ethylene-vinyl alcohol copolymer particles according to claim 1.

12. The coating agent according to claim 11, further comprising at least one selected from the group consisting of an inorganic lamellar compound, a crosslinking agent, a surfactant, a leveling agent, an antifungal agent, and a preservative.

13. A film made of the coating agent according to claim 11.

14. A laminate wherein the coating agent according to claim 11 is applied to a substrate.

15. The laminate according to claim 14, wherein the substrate is a paper.

16. The laminate according to claim 14, wherein an adhesive component layer is inserted between a coating layer made of the coating agent and the substrate.

\* \* \* \* \*